(12) United States Patent
Anderson

(10) Patent No.: US 6,745,665 B2
(45) Date of Patent: Jun. 8, 2004

(54) SOLENOID CONTROLLED VALVE

(75) Inventor: Robert Alan Anderson, West Midlands (GB)

(73) Assignee: Lucas Industries Limited (GB)

( * ) Notice: Subject to any disclaimer, the term of this patent is extended or adjusted under 35 U.S.C. 154(b) by 0 days.

(21) Appl. No.: 10/300,717

(22) Filed: Nov. 19, 2002

(65) Prior Publication Data

US 2003/0084947 A1 May 8, 2003

Related U.S. Application Data

(62) Division of application No. 09/815,986, filed on Mar. 23, 2001, now Pat. No. 6,481,332, which is a continuation of application No. PCT/GB99/03149, filed on Sep. 22, 1999.

(30) Foreign Application Priority Data

Sep. 23, 1998 (GB) .............................................. 9820620

(51) Int. Cl.[7] .............................................. F15B 13/044
(52) U.S. Cl. ................ 91/459; 137/625.65; 251/129.08
(58) Field of Search ...................... 91/459; 137/625.65; 251/129.08

(56) References Cited

U.S. PATENT DOCUMENTS

| | | |
|---|---|---|
| 3,770,018 A | 11/1973 | Sugimura |
| 4,316,599 A | 2/1982 | Bouvet et al. |
| 4,711,269 A | 12/1987 | Sule |
| 4,719,944 A | 1/1988 | Cleasby |
| 4,997,004 A | 3/1991 | Barkhimer |
| 5,144,881 A | 9/1992 | Cakmaz |
| 5,186,093 A | 2/1993 | Kervagoret |
| 5,191,827 A | 3/1993 | Kervagoret |
| 5,209,261 A | 5/1993 | Cakmaz et al. |
| 5,234,030 A | 8/1993 | Kervagoret et al. |
| 5,323,809 A | 6/1994 | Tischer et al. |
| 5,333,947 A | 8/1994 | Kervagoret |
| 5,404,791 A | 4/1995 | Kervagoret |
| 5,410,943 A | 5/1995 | Kervagoret |
| 5,417,241 A | 5/1995 | Tischer et al. |
| 5,658,057 A | 8/1997 | Ohnuma et al. |
| 5,727,851 A | 3/1998 | Ohkubo et al. |
| 5,785,087 A | 7/1998 | Takahashi et al. |

FOREIGN PATENT DOCUMENTS

| | | |
|---|---|---|
| EP | 0 319 618 | 6/1989 |
| EP | 0 800 003 | 10/1997 |
| EP | 0 802 357 | 10/1997 |
| WO | 97/43154 | 11/1997 |

OTHER PUBLICATIONS

Abstract of Japanese Publication 60–157575, Published Aug. 17, 1985.

*Primary Examiner*—Gerald A. Michalsky
(74) *Attorney, Agent, or Firm*—MacMillan, Sobanski & Todd, LLC

(57) ABSTRACT

In a solenoid-controlled valve assembly a biasing means (21) is adapted to apply a resisting force to a spool (22) in a direction opposite to the direction substantially of a force applied by an armature (14), and engagement between at least one of the spool and the biasing means and the spool and the armature is through an engagement means defining a single point of contact. The spool (22) may be provided with at least one land adapted to connect and disconnect two flow passages (6, 8), and the first ends of the two passages are spaced apart in a direction parallel to the axis of the bore by a smaller distance than the spacing between the second ends of the passages.

13 Claims, 4 Drawing Sheets

SOLENOID CONTROLLED VALVE

CROSS REFERENCE TO RELATED APPLICATIONS

This application is a divisional of U.S. patent application Ser. No. 09/815,986, now U.S. Pat. No. 6,481,332, filed Mar. 23, 2001, which was as continuation of Application No. PCT/GB99/03149, filed Sep. 22, 1999.

BACKGROUND OF THE INVENTION

This invention relates to improvements in solenoid-controlled valve assemblies especially but not exclusively for vehicle hydraulic braking systems, for example for braking systems of the electro-hydraulic type.

Known solenoid-control valve assemblies for use in electro-hydraulic braking systems typically comprise a spool working in a bore in a body or sleeve in which movement of the spool acts to connect and disconnect passages for providing fluid communication between an hydraulic power source, a brake and a reservoir. The valve usually further comprises a solenoid comprising a coil and an armature whereby energisation of the coil produces a force which displaces the armature, in turn to apply a force to the spool, to bias the spool towards one end of the bore. The force applied by the armature is resisted by a biasing means, typically a coil spring, which acts upon the spool to oppose the biasing force applied by the armature. In a most typical arrangement, the armature acts directly upon one end of the spool whilst the biasing spring acts upon the other end of the spool.

In accordance with a first aspect of our invention, in a solenoid-controlled valve assembly comprising a spool working in a bore in a body, at least a first flow passage and a second flow passage defined in the body each connecting at one end with the bore, movement of the spool within the bore being adapted to connect and disconnect said first and second flow passages, a solenoid comprising a coil fixed relative to the valve body and an armature, application of a current to the coil causes the armature to apply a force in a first direction to the spool, and a biasing means adapted to apply a resisting force to the spool in a second direction opposite to the direction substantially of the force applied by the armature, and in which engagement between at least one of the spool and the biasing means and the spool and the armature is through an engagement means defining a single point of contact.

Thus, according to the invention, the area of contact between the spool and the biasing means and/or armature comprises a single point contact. This point contact is preferably on the axis of the spool.

By providing a point contact between the spool and the biasing means, side forces acting upon the spool (ie. orthogonal to the spool axis) and friction are reduced and so the spool diameter can be reduced without risk of jamming. Also, tolerances between spool and the bore can be tightened.

The engagement means may comprise an integral part of the spool, biasing means or armature.

Preferably, the engagement means comprises a ball like member which is adapted to provide the engagement between the spool and the biasing means. The ball may be adapted to sit within a recess provided in the end of the spool on the axis of the spool.

The biasing means may comprise a resilient and an engagement member which is positioned between the spring and the spool. The engagement member may comprise a cup 56, as schematically illustrated in FIG. 3, which sits in the end of the spring and provides a surface (facing away from the spring) which engages the ball at a center position. The engagement member is adapted to be displaced out of its plane of rest when a force is applied to the ball along the axis of the spool, in turn to compress the spring.

The armature may be adapted to act upon an intermediate member which is adapted to act upon an end face of the spool whilst the opposite end face of the spool acts upon the biasing means through a single point engagement.

The intermediate member may comprise an elongate guide rod adapted to fit loosely within a guide bore defined in a guide body. The guide body may be fixed relative to the valve body which defines the bore in which the spool operates. The guide is preferably axially aligned with the bore in which the spool operates.

By providing the intermediate member between the armature and the spool, it is possible to substantially reduce any risk of side forces being applied to the spool when the armature is displaced by the magnetic forces generated in the coil. The gap between the intermediate member and the walls of the bore prevents friction between the two, although the bore helps in aligning the intermediate member during assembly.

The engagement between the intermediate member, the armature and/or the spool may be through a respective single point of contact.

Of course, it will be understood that the engagement between the spool and the biasing means may be direct contact between the two or indirect contact through an engagement member, such as cup shaped member and the ball already proposed herein before. For example, the end of the spool may be domed or sharpened to a point and engage directly with the biasing means.

In a most preferred arrangement, the biasing means may comprise a coil spring arranged concentrically with a line passing through the axis of the spool, which may act upon the spool through an intermediate member such as a cup or an annular disc, the engagement between the centre of the disc and spool defining a point contact. This arrangement results in a reduction in side forces in the spool.

The spool may work in a bore defined in a sleeve in a body. The spring may then be fixed relative to the sleeve.

In accordance with a second aspect of our invention (as schematically illustrated in FIG. 2) in an electro-hydraulic braking system comprising a source of pressurized fluid 40, a reservoir 34, at least one brake actuator 38, and a solenoid-controlled valve assembly 32 according to the first aspect of the invention, the valve assembly includes at least three substantially radial flow passages, a first passage being connected to a pressure source, a second passage connected to the reservoir, and a third passage connected to the brake.

According to a yet further aspect of our invention, in a solenoid-control valve assembly, comprising a spool working in a bore in a housing, and at least a first and a second flow passage, each passage extending through a wall of the housing and having a first end opening into the bore and a second end communicating with the external surface of the housing, the spool is provided with at least one land adapted to connect and disconnect the two passages, and the first ends of the two passages are spaced apart in a direction parallel to the axis of the bore by a smaller distance than the spacing between the second ends of the passages.

The housing may comprise a unitary body, or sleeve housed in a bore in a body.

The invention thus enables a spool of relatively short axial length to be provided because of the close spacing between the first ends of the passages.

Preferably, at least one of the passages is inclined at a non-zero angle relative to the axis of the bore and to a plane orthogonal to the axis of the bore, ie. the passage extends radially but not orthogonal to the bore axis.

One or more of the other passages may extend radially orthogonal to the bore.

In a most preferred arrangement, three radial passages may be provided, one inclined at a non-zero angle relative to the axis of the bore and a plane orthogonal to the axis of the bore, one orthogonal to the bore and the other inclined at an opposite angle to the first passage. This balances out the axial components of forces due to fluid in the passages acting upon the spool. The two inclined passages may be provided on either side of the orthogonal passage.

The passages may thus form an arrow head shape comprising V-shape formed from the first and third passages which is dissected by the second passage, the head of the arrow being at the bore in the sleeve.

The two or more passages may extend radially from the bore in a single plane containing the axis of the bore.

In one arrangement, the passages are formed by drilling through the housing into the bore to form straight passages.

Each passage 50, 52, 54 may comprise part of a set of passages consisting of one or more corresponding passages inclined at the same angle which are spaced circumferentially around the bore. For instance, each passage may have a single corresponding passage provided on the diametrically opposed side of the body, as schematically illustrated in FIG. 3. Alternatively, three passages spaced at 120 degree intervals may be provided. This helps to balance any side force components acting on the spool due to the pressure of any fluid in the passages. Each passage and its corresponding passage or passages may be interconnected by an annular flow space defined around the outside of the body. When the bore is defined in a sleeve located in a larger bore in a body, the flow spaces for each set of passages may be isolated from adjacent flow spaces by one or more elastomeric seals connecting the body to a sleeve which surrounds the body. FIG. 4 is a schematic view of a cross section of the sleeve 3 illustrated in FIG. 3. FIG. 4 illustrates one set of passages 50 interconnected by a flow space to a source of pressurized fluid 40.

A number of ports may be provided in the housing around the sleeve to allow an external fluid line to be connected to each flow space. Where three passages are provided, one flow space may be connected to a reservoir, the other to a brake and the other to a source of pressure fluid. The valve may therefore comprise a part of an electro-hydraulic braking system with connections between the valve and the remaining portions of the system as described above. Of course, the valve could be connected to the brakes in any other manner, and may have two or more sets of passages.

A first passage may be connected to a fluid reservoir. A second passage may be connected to a brake. A third passage may be connected to a source of pressurised hydraulic fluid.

A filter may be provided at or across the end of each or some of the passages at their second end away from the bore. The filter may help to prevent debris and contaminants entering the bore containing the spool.

The diameter of one or more of the passages may be stepped or may be of a single constant diameter.

There will now be described, by way of example only, one embodiment of the present invention with reference to the accompanying drawings of which:

DETAILED DESCRIPTION OF THE INVENTION

Figure 1:
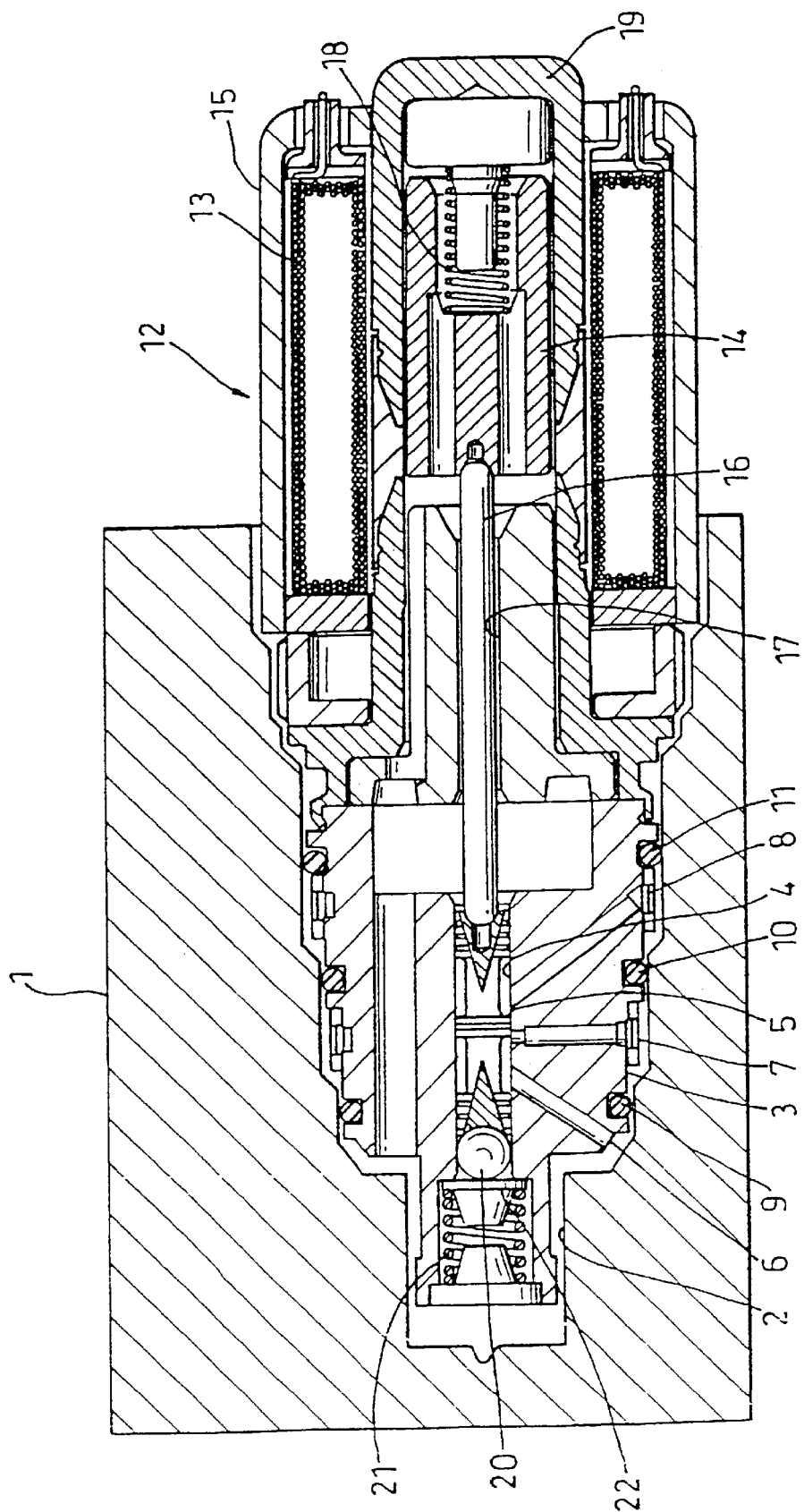
FIG. 1 is a cross-sectioned illustration of a first embodiment of a solenoid-controlled valve assembly.
Figure 2:
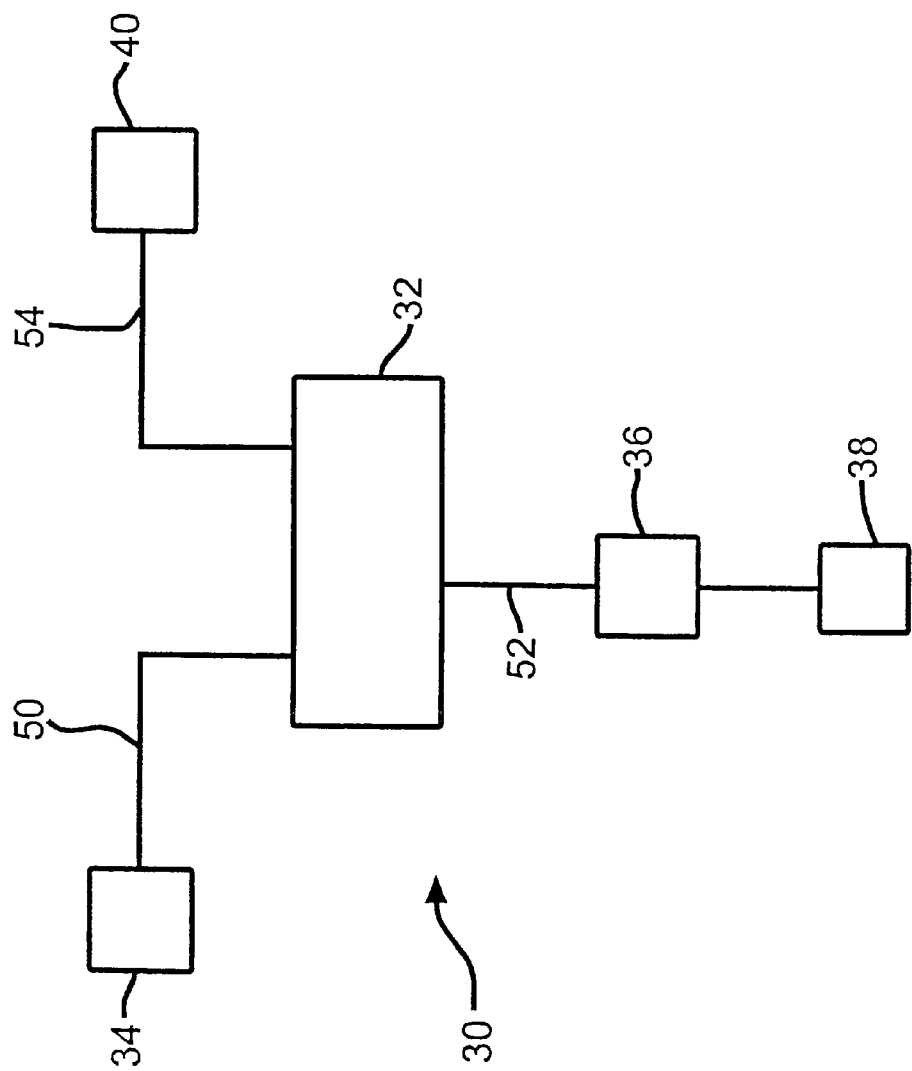
FIG. 2 is a schematic diagram of a brake assembly including the valve assembly according to the invention.
Figure 3:
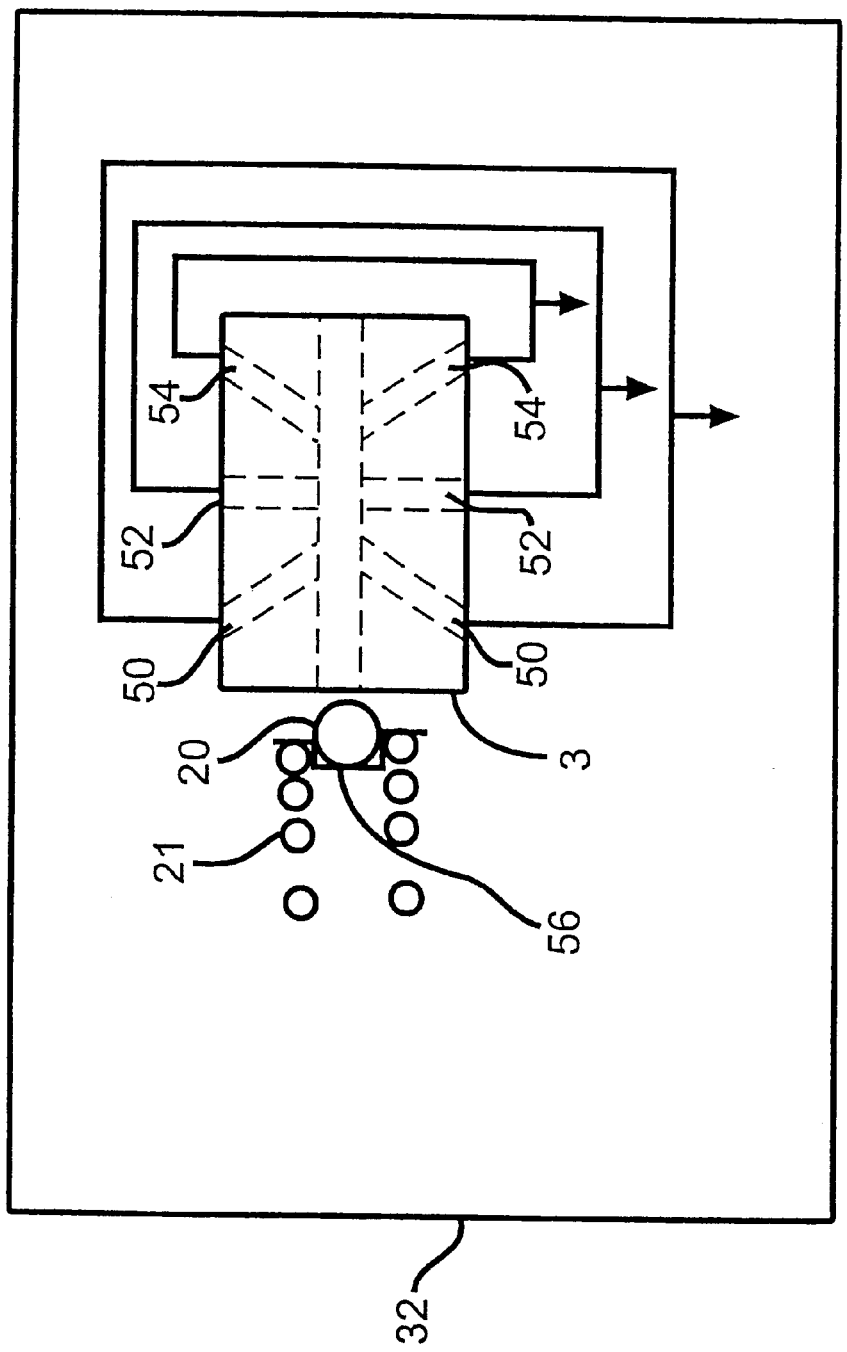
FIG. 3 is a schematic diagram of the valve assembly according to the invention.
Figure 4:
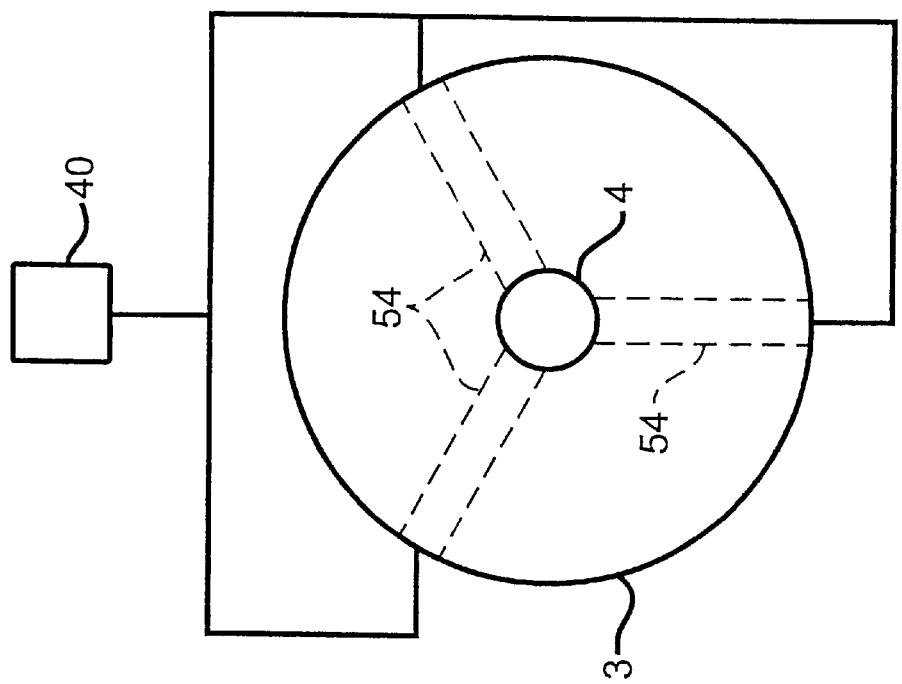
FIG. 4 is a schematic diagram of a cross section of the valve assembly of FIG. 3.

The solenoid controlled valve assembly shown in FIG. 1 of the accompanying drawings comprises an outer flow valve body 1 which is provided with a blind bore 2 of stepped profile to define three axially aligned bore portions of differing diameter. The blind bore is adapted to receive a sleeve 3 having a central through bore 4 within which an elongate spool 5 is adapted to be slidably received.

The sleeve 3 has a stepped outer perimeter approximately complimentary to the steps in the bore 2 and is sealed to the bore at three points along its length by a number of spaced apart annular seals 9, 10, 11. The body 1 and the sleeve 3 therefore define three annular flow spaces around the outside of the sleeve, each flow space being defined by a length of sleeve provided between an enclosed end of the blind bore and the first seal 9, the first and second seals 9, 10, and the second and third seals 10, 11 respectively, and each bounded by the sleeve 3 and the bore 2. From each flow space, an outer end of at least one flow passage 6, 7, 8 is formed, the passage extending from the outside of the sleeve to the inner bore 4. The outer end of each flow passage 6, 7, 8 is protected by a filter to prevent debris entering the flow passages which could block the movement of the spool and jam the flow valve. Thus, each flow space is connected to the bore by at least one radial flow passage. In practice, it is preferred to provide at least two diametrically opposed passages connecting each flow space to the bore.

The second passage 7 is provided by drilling a straight bore through the sleeve 3 orthogonal to the axis of the spool. The first and third 8 passages are formed by drilling through the sleeve at an angle inclined away from the second passage so that the ends of the first and third passages at the bore are closer together than the ends of the first and third passages at their opposite ends.

Inclining the passage enables the spool to be made shorter than when three orthogonal passages are provided. At the outside ends of the passages, the spacing must be sufficient to accommodate the seals which run around the sleeve to define the fluid spaces. Also, a connection must be made from each annular fluid space to an external fluid line. This again determines a minimum width for the spacing between the seals.

At the other end of the passages where they join the bore no such restrictions need to be met. Accordingly, they can be placed closer together, reducing the axial length of the spool.

In addition to the three passages detailed herein above, each passage is connected by its respective external flow space to a complimentary passage on the diametrically opposite side of the bore. This ensures that the pressure of fluid in a passage produces radial forces on the spool which are opposed by the forces due to pressure in the complimentary passage. Side forces on the spool are thus minimised, reducing the risk of jamming of the spool in the bore.

The spool 5 is adapted to be a close tolerance fit within the bore 4 to provide fluid sealing and is provided with a pair of portions of reduced diameter separated by a portion of larger diameter. In fact, the spool 5 can be considered to comprise five portions the two end portions and the middle portion being of substantially the same diameter as the bore whilst the remaining two portions are of reduced diameter relative to the bore.

The axial length of the land defined by the middle portion of the spool 5 is selected in conjunction with a selection of the spacing between the points at which the passages open into the bore so that when the spool is in a first position, a first one of the flow passages in the sleeve is in fluid communication with a second one of the flow passages whilst the land isolates the second flow passage from the third passage. In a second position of the spool, the land isolates the first passage from the second passage and connects the second passage to the third passage. Thus it will be appreciated that movement of the spool in the bore connects and disconnects selected ones of the passages.

A solenoid 12 is provided comprising a coil 13 supported in a casing 15 relative to the body 1 and an armature 14 provided in the coil. The armature 14 engages a guide rod 16 which works in a guide body 17, in turn to engage the end of the spool 5 facing the open end of the blind bore 2. As shown in FIG. 1, the armature 14, guide rod 15 and spool 5 are all aligned on the same axis. A light spring 18 provided between the armature 14 and an end cap 19 of the coil casing 15 removes any free play from the components. The other end of the spool 5 nearest the closed end of the bore in the body is provided with a slight recess which locates a ball 20. The ball 20 protrudes from the end of the spool and engages with a biasing means comprising a coil spring 21 which acts through an engagement member 22 to resist movement of the spool towards the closed end of the blind bore under the action of a force generated by the solenoid. The ball engages a central portion of a flat face of the engagement member to transfer forces from the spool to the spring.

In a brake assembly 30, the valve assembly 32 can be arranged such that the first passage 50 is connected to a reservoir 34, the second passage 52 is connected to a brake line 36 which is subsequently connected to brake actuator 38, and the third passage 54 is connected to a pressure source of hydraulic fluid 40. When the solenoid armature is at rest with the coil de-energized, the spool is biased to the right in the bore by the planar spring. In this position, the central portion of the spool ensures the brake and reservoir are connected and isolated from the pressure source by isolating the third passage from the other two passages.

Application of a current to the coil 13 generates a magnetic field which urges the armature to the right towards the spool 5. The armature 14 acts upon the guide rod 16. In turn, the guide rod 16 acts on the spool 5 to urge the spool 5 to the left. This movement is opposed by the spring 21. As the current increases, the force applied by the armature increases, and the spool is moved further to the left.

Movement of the spool 5 towards the left causes the brake passage to be isolated from the reservoir whilst further movement causes the pressure passage to be progressively connected to the brake. The exact axial length of the middle portion of the spool and the diameter and position of the opening of the passages into the bore in the sleeve determine the exact characteristic of the transfer from connected to disconnected passages.

It will also be seen that the blind bore 2 is adapted to receive an end of the solenoid housing to ensure correct axial alignment of the spool and solenoid with ease of assembly. In practice, the valve can be assembled by sequentially inserting the sleeve into the bore 1 after securing the spring to the sleeve 3, and the spool into the bore in the sleeve. The guide body and guide rod are next inserted into the bore. Finally, the solenoid comprising the coil and armature are slid or screwed into position in the end of the bore to complete the unit.

It will of course, be readily understood that the above embodiment an example only. Many variations are envisaged within the scope of the invention. For example, the ball could be replaced by any other component (possibly integral with the spring, the spool or separate from both) which ensures that a point contact is provided between the spool and the biasing means. The recess in the end of the spool is present as a pilot bore used to locate the spool on a lathe during manufacture, and whilst it is convenient to retain the bore to locate the ball, it is not essential to at least one aspect of the invention. For instance, the end of the spool could be machined to a point to provide the single point of contact which reduces side forces.

Whilst the specific embodiments of the invention have been described in terms of a proportional flow-control valve, it may also find application in a digital flow-control valve in which the spool is adapted to be movable between only a first discrete position in which first and second passage are interconnected, and a second discreet position in which the two passages are isolated.

What is claimed is:

1. A solenoid-controlled valve assembly comprising:
   a body defining a bore, at least a first flow passage and a second flow passage defined in said body, each said passage connecting at one end with said bore;
   a spool working in said bore in said body, movement of said spool within said bore connecting and disconnecting said first and second flow passages;
   a solenoid comprising a coil fixed relative to said body;
   an armature, wherein application of a current to said coil causes said armature to apply a force in a first direction to said spool;
   a biasing means arranged to apply a resisting force to said spool in a second direction opposing said force applied by said armature;
   a ball being arranged to sit within a recess of said spool; and
   a disc having opposing first and second ends, the second end having a flat face, said disc disposed between said biasing means and said ball, such that the first end of said disc engages said biasing means, and the flat face of the second end of said disc engages said ball such that said disc and said ball define a single point of contact.

2. The solenoid-controlled valve assembly according to claim 1, wherein said spool has an axis and said point contact is on said axis of said spool.

3. The solenoid-controlled valve assembly according to claim 1, wherein said recess is provided in an end of said spool on said axis of said spool.

4. The solenoid-controlled valve assembly according to claim 1, wherein said armature is arranged to act upon an intermediate member which in turn acts upon an end face of said spool whilst an opposite end face of said spool acts upon said biasing means through said ball.

5. The solenoid-controlled valve assembly according to claim 4, wherein said intermediate member comprises an elongate guide rod adapted to fit loosely within a guide bore defined in a guide body.

6. The solenoid-controlled valve assembly according to claim 1, wherein each of said first and second flow passages extends through a wall of said body and has a first end opening into said bore and a second end communicating with an external surface of said body, in which said spool is provided with at least one land which connects and disconnects said first and second flow passages, and wherein said first ends of each of said first and second flow passages are spaced apart in a direction parallel to the axis of said bore by a smaller distance than a spacing between said second ends of said passages.

7. The solenoid-controlled valve assembly according to claim 6, wherein said body comprises a sleeve housed in a bore in a second body.

8. The solenoid-controlled valve assembly according to claim 7, wherein at least one of said passages is inclined at a non-zero angle relative to the axis of said bore and to a plane orthogonal to the axis of said bore, such that said passage extends radially but not orthogonal to the bore axis.

9. The solenoid-controlled valve assembly according to claim 8 wherein at least one of said passages extends radially orthogonal to the bore.

10. The solenoid-controlled valve assembly according to claim 9, wherein three radial passages are provided, one inclined at a non-zero angle relative to the axis of said bore and a plane orthogonal to the axis of the bore, one orthogonal to said bore and another inclined at an opposite angle to said first passage.

11. The solenoid-controlled valve assembly according to claim 10, wherein said two inclined passages are provided on either side of said orthogonal passage.

12. The solenoid-controlled valve assembly according to claim 6, wherein each passage comprises part of a set of passages consisting of at least one corresponding passages inclined at the same angle which are spaced circumferentially around said bore.

13. An electro-hydraulic braking system comprising a source of pressurized fluid, a reservoir, at least one brake actuator, and a solenoid-controlled valve assembly, said valve assembly including a body defining a bore, at least a first flow passage and a second flow passage defined in said body, each said passage connecting at one end with said bore, a spool working in said bore in said body, movement of said spool within said bore connecting and disconnecting said first and second flow passages, a solenoid comprising a coil fixed relative to said body, an armature, wherein application of a current to said coil causes said armature to apply a force in a first direction to said spool, a biasing means arranged to apply a resisting force to said spool in a second direction opposing said force applied by said armature, a ball being arranged to sit within a recess of said spool, and a disc having opposing first and second ends, the second end having a flat face, said disc disposed between said biasing means and said ball, such that the first end of said disc engages said biasing means, and the flat face of the second end of said disc engages said ball such that said disc and said ball define a single point of contact.

* * * * *